July 18, 1933. A. HELBIG 1,918,907
DIATHERMIC AND RONTGEN APPARATUS
Filed March 5, 1931
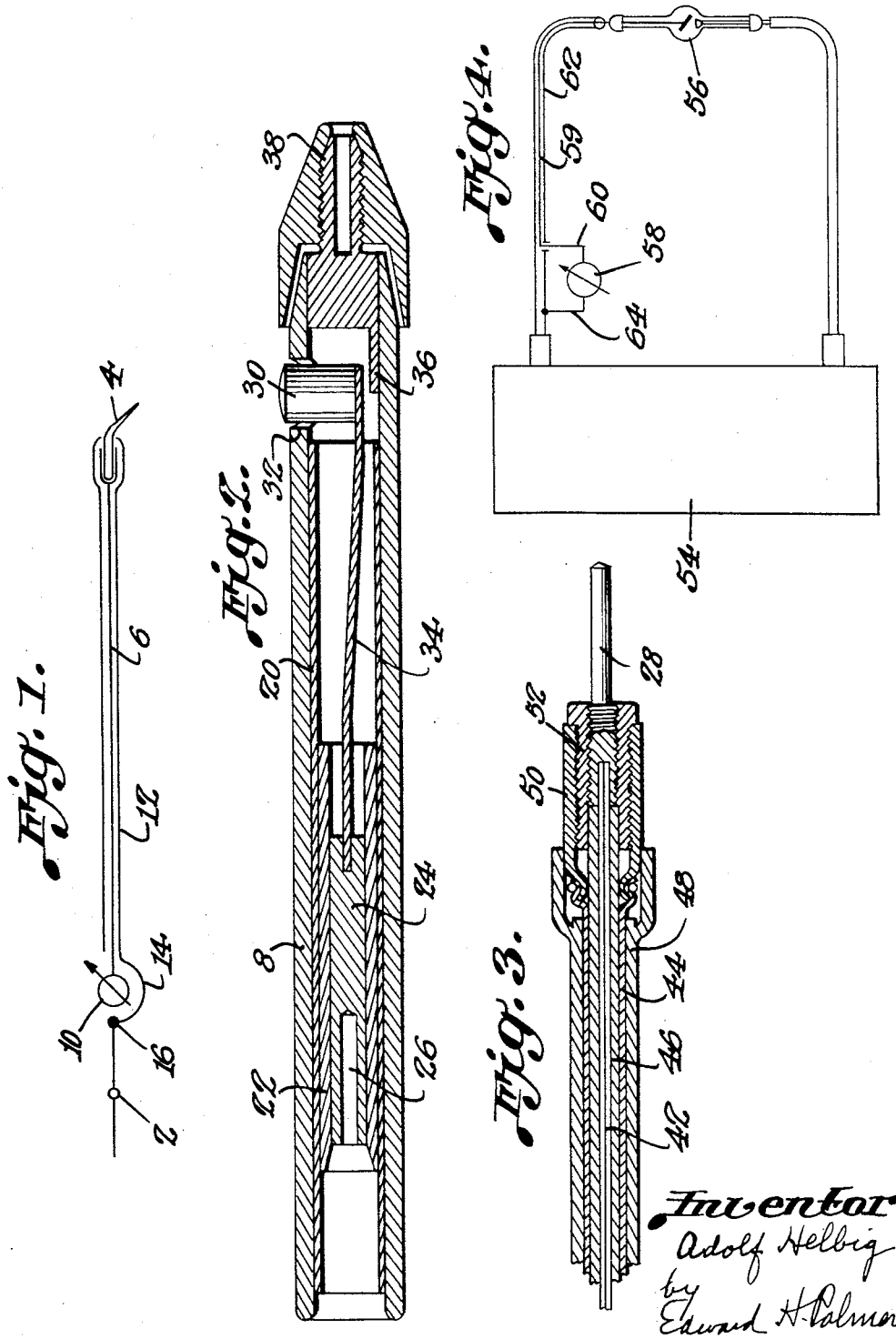

Patented July 18, 1933

1,918,907

UNITED STATES PATENT OFFICE

ADOLF HELBIG, OF BERLIN, GERMANY, ASSIGNOR TO ELECTRICITÄTS-GESELLSCHAFT "SANITAS" M. B. H., OF BERLIN, GERMANY, A CORPORATION OF GERMANY

DIATHERMIC AND RÖNTGEN APPARATUS

Application filed March 5, 1931, Serial No. 520,438, and in Germany March 12, 1930.

This invention relates to diathermic Röntgen and analogous apparatus and has for its object more particularly to provide means to prevent false indications by the measuring instrument, in apparatus of the character referred to, due more particularly to current leakage.

The invention and its aims and objects will be best understood from the following description, taken in connection with the accompanying drawing of an illustrative embodiment of the invention in its application to diathermic and Röntgen apparatus.

In the drawing:

Fig. 1 is a diagrammatic view of an illustrative embodiment of the invention;

Fig. 2 is a longitudinal section of a screened off or sheathed electrode holder;

Fig. 3 is a longitudinal section of a screened or sheathed conductor for use with said holder;

Fig. 4 illustrates the application of the invention to Röntgen-ray apparatus.

Certain uses of diathermic currents, for example the killing of nerves in dentistry, require that the current shall be adjustable to a certain strength. Heretofore such an exact adjustment of the strength of the current has been difficult to obtain because, on account of the non-controllable leakage that occurs in the conductor leading to the electrode or other working instrument, the measuring instrument does not accurately indicate the strength of the current present in the electrode. One of the objects of the present invention is to prevent such inaccurate indications.

In accordance with the present invention the connecting conductor is surrounded upon all sides by suitable protecting means. Said protecting means may be of any suitable material and in the embodiment of the invention herein shown for illustrative purposes, is composed of metal, said protector means being electrically connected to the receiving terminal of the measuring instrument. In the illustrative embodiment of the invention said protector means conveniently consists of tubular means, conveniently a metal bushing which surrounds the conductor from the measuring instrument to the electrode.

In certain cases the measuring instrument may also be protected. For this purpose it may conveniently be located on the holder of the electrode or other working instrument, or at its rear end for example, but any other suitable location will serve. For example, said measuring instrument may be located before a flexible conductor leading to the electrode, said conductor being also protected by suitable protector means, a metal hose or a covering of metal braiding for example, electrically connected on the one hand to the protector bush in the holder, and on the other hand to the protector covering of the measuring instrument, where such a protector covering for said measuring instrument is provided. As the protector covering has substantially the same potential as the conductor leading to the electrode, enclosed by said covering, leakage from said conductor is practically entirely eliminated. The slight difference in potential which may result from leakage of the protector covering cannot result in any losses worth mentioning due to leakage from the conductor.

Referring to Fig. 1 an electrical connection leading from the terminal 2 of the diathermic apparatus to the electrode 4, herein illustratively represented as an instrument used by dentists, namely a nerve needle, for example, is generally indicated by 6. This connection may comprise a conductor wire and a connecting part contained in a suitable holder, represented more specifically at 8 in Fig. 2. The entire electrically conductive connection containing the measuring instrument 10 is, in accordance with the invention, surrounded or enclosed by the protector means, in the illustrative embodiment shown consisting of a metal covering 12 insulated from said conductive connection, said metal covering, in the illustrative embodiment of the invention shown, extending also round the measuring instrument as shown at 14, of which only the dial need be visible for reading purposes, said connection being herein connected at 16 to said terminal 2.

Referring now to Fig. 2 which shows the apparatus more in detail, the holder comprises an outer casing 8 of insulating material and containing a metal tube 20 insulated by a sleeve 22 of insulating material from a central conductive core 24 bored at 26 to receive a plug 28 at one end of a connecting cable, see Fig. 3. The core 24 is electrically connected to a suitable knob or button 30 of insulating material which projects outwardly through a suitable opening 32 provided in the insulating casing 8. In the illustrative embodiment of the invention said electrical connection conveniently comprises a spring member 34 having one end rigidly secured in the conductive core 24 and its other end secured to the lower end of the knob 30, said spring being free to move without contacting with the tube 20. Pressing the knob 30 inwardly makes contact between spring 34 and a fixed contact 36, electrically connected to or integral with a bush 38 for receiving the electrode 4 or other working instrument. Tube 20, it will be seen, corresponds to part 12 and contact spring 34 to part 6 of Fig. 1. The spring 34 is therefore electrically connected to the terminal 2 through the measuring instrument 10, while the protector tube 20 is electrically connected to said terminal through a point 16 situate between said terminal 2 and said measuring instrument 10.

Referring to Fig. 3, a connecting cable is therein shown carrying at one end said plug 28 for insertion into the bore 26 of said core 24, said plug being electrically connected to the conductor wire 42 of said cable. A flexible metal layer 44, consisting for example of metal braiding or helically wound metal wire, surrounds the conductor wire 42, an insulating layer 46 being interposed between said wire 42 and said metallic layer 44, and an outer insulating layer 48 surrounding said metallic layer 44. Said metallic layer 44 is electrically connected to point 16 located between the terminal 2 and said measuring instrument 10, and at the free end of said cable (right end viewing Fig. 3) said metallic layer is electrically connected to a metal bush 50, insulated from the plug 28 by an insulating member 52, and becoming electrically connected to the tube 20 when said plug 28 is inserted into the bore 26 of the core 24 of the holder 18, whereby electrical connection between tube 20 and point 16 is established.

The invention is also applicable to other apparatus in which a measuring instrument is located at a considerable distance from the current consuming apparatus and conditions are favorable to the occurrence of current losses due to leakage. This applies to Röntgen-ray apparatus for example, where the milliammeter is located at a considerable distance from the Röntgen-ray tube which herein constitutes the working instrument. In this type of apparatus as in diathermic apparatus, low strength currents are used, so that losses in the operating current must be considered. The only difference lies in the main cause of the losses due to leakage. In diathermic apparatus, which does not operate with high tension, such losses are due particularly to the high frequency, whereas in Röntgen-ray apparatus, which operate essentially with continuous voltage or with pulsating continuous current of low frequency, the losses due to leakage result from the unusually high working voltage which often rises to approximately 400,000 volts.

Referring to Fig. 4, I have therein shown an illustrative Röntgen-ray apparatus provided with means in accordance with this invention for eliminating false indications by the milliammeter. In said figure a high tension generator is shown at 54, a Röntgen-ray tube at 56 and a milliammeter for measuring the tube current at 58. The conductor 59 from the leading-out terminal 60 of the milliammeter to the Röntgen-ray tube extends through and is insulated from a metal covering 62 which is electrically connected to the entrance terminal 64 of the milliammeter. Losses due to leakage occurring in the metal covering 62 between the milliammeter and the Röntgen-ray tube are thus not measured.

I am aware that the invention may be embodied in other specific forms without departing from the spirit or essential attributes thereof; and I therefore desire the present embodiment to be considered in all respects as illustrative and not restrictive, reference being had to the appended claims rather than to the foregoing description to indicate the scope of the invention.

I claim:

1. In apparatus of the class described, in combination, a current measuring instrument; a surgical instrument; an electrical conductor for electrically connecting said current measuring instrument and said surgical instrument; and metal protector means surrounding said electrical conductor upon all sides, said protector means being electrically connected to the receiving terminal of said current measuring instrument in order to protect the indications of said instrument against external electrical influences.

2. In electro-therapeutic apparatus of the character described, in combination, a current measuring instrument; an electrical conductor connecting said measuring instrument with means for utilizing the current; an insulating sleeve around a portion of the conductor; an electrically conductive protective shield on the insulating shield and electrically connected to the receiving terminal of said instrument to prevent false indications due to external electrical influences; and an insulating casing on said protective shield.

ADOLF HELBIG.